United States Patent
Romero et al.

(10) Patent No.: US 10,979,376 B2
(45) Date of Patent: *Apr. 13, 2021

(54) SYSTEMS AND METHODS TO COMMUNICATE A SELECTED MESSAGE

(71) Applicant: eBay Inc., San Jose, CA (US)

(72) Inventors: Steve Romero, Portland, OR (US); Jonas Oscar Klink, White Plains, NY (US); Jason Allen Fletchall, San Jose, CA (US); Andrew David Palmer, Campbell, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/263,992

(22) Filed: Jan. 31, 2019

(65) Prior Publication Data

US 2019/0173820 A1  Jun. 6, 2019

Related U.S. Application Data

(63) Continuation of application No. 14/139,427, filed on Dec. 23, 2013, now Pat. No. 10,212,115.

(60) Provisional application No. 61/815,687, filed on Apr. 24, 2013.

(51) Int. Cl.
 *G06F 15/16* (2006.01)
 *H04L 12/58* (2006.01)
 *G06Q 10/10* (2012.01)

(52) U.S. Cl.
 CPC ........... *H04L 51/14* (2013.01); *G06Q 10/107* (2013.01)

(58) Field of Classification Search
 None
 See application file for complete search history.

(56) References Cited

U.S. PATENT DOCUMENTS

| | | | |
|---|---|---|---|
| 6,499,021 B1 * | 12/2002 | Abu-Hakima | G06Q 10/10 706/10 |
| 7,330,895 B1 | 2/2008 | Horvitz | |
| 7,912,899 B2 * | 3/2011 | Beauchamp | H04W 68/00 709/204 |

(Continued)

OTHER PUBLICATIONS

Non-Final Office Action received for U.S. Appl. No. 14/139,427, dated Nov. 2, 2016, 27 pages.

(Continued)

*Primary Examiner* — Phyllis A Book
(74) *Attorney, Agent, or Firm* — Shook, Hardy & Bacon L.L.P.

(57) ABSTRACT

A system may detect multiple accesses of an engagement interface from a user. The multiple accesses may include a first group of accesses performed by a first device and a second group of accesses performed by a second device. Both the first device and the second device may correspond to the user. A message may be selected from a set of messages. Moreover, the message may correspond to the engagement interface. The system may identify the first group of accesses as having a greater amount of user interaction with the engagement interface than the second group of accesses. The system may then determine that the selected message has the greatest likelihood of being read on the first device. The selected message may be communicated to the first device based on the determination.

20 Claims, 9 Drawing Sheets

(56) References Cited

U.S. PATENT DOCUMENTS

| | | | |
|---|---|---|---|
| 8,464,180 B1* | 6/2013 | Kirkham | H04M 1/72586 715/810 |
| 8,572,182 B2 | 10/2013 | Klassen | |
| 8,606,858 B1 | 12/2013 | Acharya et al. | |
| 8,965,986 B1* | 2/2015 | Acharya | H04M 15/844 709/206 |
| 9,219,790 B1 | 12/2015 | Filev et al. | |
| 9,317,857 B1 | 4/2016 | Terleski et al. | |
| 10,212,115 B2 | 2/2019 | Romero et al. | |
| 2008/0225870 A1 | 9/2008 | Sundstrom | |
| 2009/0030772 A1 | 1/2009 | Flake et al. | |
| 2012/0011213 A1 | 1/2012 | Klassen | |
| 2013/0086179 A1* | 4/2013 | Coleman | G06Q 10/10 709/206 |
| 2014/0122622 A1 | 5/2014 | Castera et al. | |
| 2014/0143682 A1* | 5/2014 | Druck | G06Q 30/0241 715/752 |
| 2014/0237105 A1 | 8/2014 | Hofleitner et al. | |
| 2014/0325390 A1 | 10/2014 | Romero et al. | |

OTHER PUBLICATIONS

Response to Non-Final Office Action filed on Mar. 31, 2017 for U.S. Appl. No. 14/139,427, dated Nov. 2, 2016, 15 pages.

Final Office Action received for U.S. Appl. No. 14/139,427, dated Jul. 14, 2017, 24 pages.

Response to Final Office Action filed on Oct. 9, 2017 for U.S. Appl. No. 14/139,427, dated Jul. 14, 2017, 13 pages.

Non-Final Office Action received for U.S. Appl. No. 14/139,427, dated Feb. 7, 2018, 30 pages.

Response to Non-Final Office Action filed on May 4, 2018, for U.S. Appl. No. 14/139,427, dated Feb. 7, 2018, 25 pages.

Final Office Action received for U.S. Appl. No. 14/139,427, dated Aug. 2, 2018, 46 pages.

Notice of Allowance received for U.S. Appl. No. 14/139,427, dated Oct. 3, 2018, 15 pages.

* cited by examiner

SYSTEMS AND METHODS TO COMMUNICATE A SELECTED MESSAGE

RELATED APPLICATION

This application is a continuation of U.S. patent application Ser. No. 14/139,427, titled "Systems and Methods to Communicate a Selected Message," filed Dec. 23, 2013, which claims the benefit of U.S. Provisional Patent Application No. 61/815,687, titled "Customizable Notifications," filed Apr. 24, 2013, all of which are incorporated herein by reference in their entirety.

TECHNICAL FIELD

The subject matter disclosed herein generally relates to the processing of data. Specifically, the present disclosure addresses systems and methods to communicate a selected message.

BACKGROUND

A message that corresponds to a web page may be sent to a user device belonging to a user. The message may include information regarding a web page that the user has browsed.

BRIEF DESCRIPTION OF THE DRAWINGS

Some embodiments are illustrated by way of example and not limitation in the figures of the accompanying drawings.

DETAILED DESCRIPTION

Example methods and systems are directed to communicating a selected message. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

An online system may send a message to a device belonging to a user. The message may correspond to an engagement interface (e.g., web page, a smart-phone application, audio file) that the user has accessed. In some instances, the user may own and operate multiple devices (e.g., a smartphone, a desktop computer, a laptop). Moreover, the user may access the engagement interface using each of the devices owned by the user. To prevent the message from being overlooked by the user, the online system may identify a device that the user is most likely going to use to read or listen to the message. To accomplish this, the online system may track interaction with the engagement interface conducted by each of the devices owned by the user.

Figure 1:
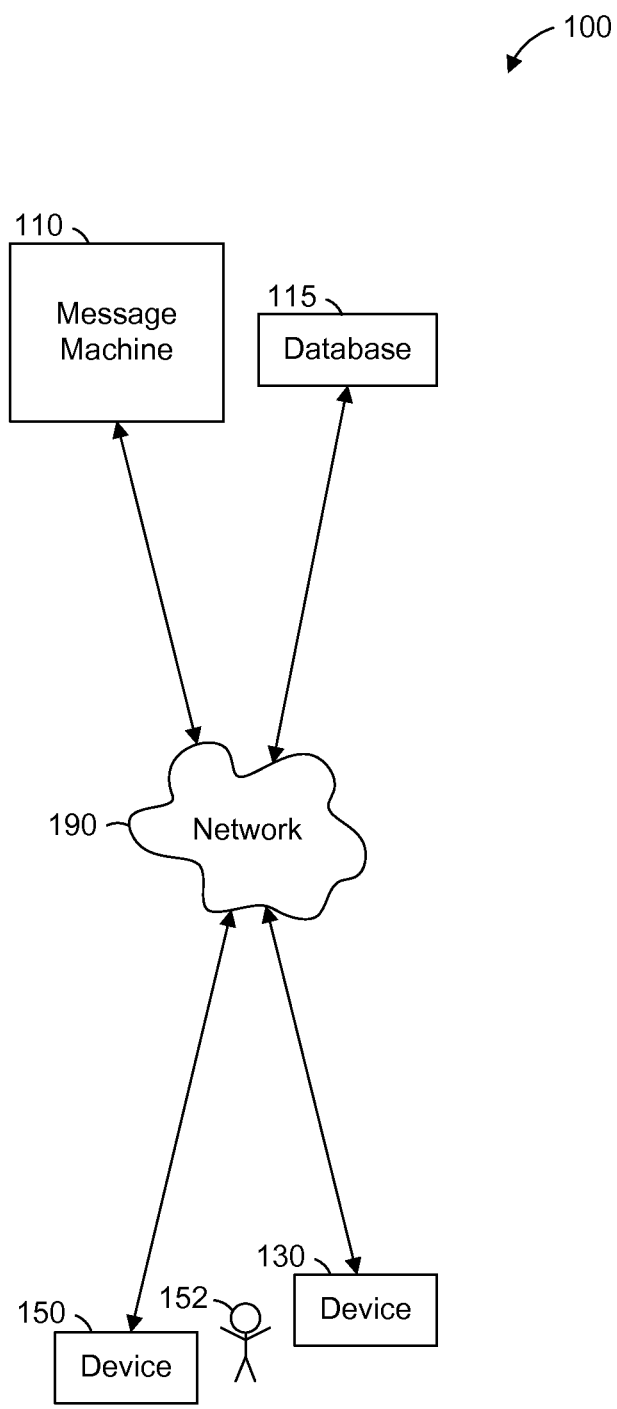
FIG. 1 is a network diagram illustrating a network environment suitable to send a message corresponding to an engagement interface, according to some example embodiments.

FIG. 1 is a network diagram illustrating a network environment 100 suitable to send a message corresponding to an engagement interface, according to some example embodiments. The network environment 100 includes a message machine 110, a database 115, and devices 130, and 150, all communicatively coupled to each other via a network 190.

Also shown in FIG. 1 is user 152. User 152 may be a human user (e.g., a human being), a machine user (e.g., a computer configured by a software program to interact with the device 130), or any suitable combination thereof (e.g., a human assisted by a machine or a machine supervised by a human). The user 152 is not part of the network environment 100, but is associated with the device 130 and may be a user of the device 130. For example, the device 130 may be a desktop computer, a vehicle computer, a tablet computer, a navigational device, a portable media device, or a smart phone belonging to the user 152. Moreover, the user 152 may be associated with the device 150 and may be a user of the device 150. As an example, the device 150 may be a desktop computer, a vehicle computer, a tablet computer, a navigational device, a portable media device, or a smart phone belonging to the user 152. A message from the message machine 110 may be sent to one of the devices 130 and 150. One of the devices 130 and 150 may be selected based on determining that the user 152 has the greatest likelihood of reading or listening to the message sent to the selected device. The message may correspond to an engagement interface that the user 152 has browsed using both devices 130 and 150.

Any of the machines, databases, or devices shown in FIG. 1 may be implemented in a general-purpose computer modified (e.g., configured or programmed) by software to be a special-purpose computer to perform one or more of the functions described herein for that machine, database, or device. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the message machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 190 may communicate information via a transmission medium. As used herein, "transmission medium" shall be taken to include any intangible medium that is capable of storing, encoding, or carrying instructions for execution by a machine, and includes digital or analog communication signals or other intangible media to facilitate communication of such software.

Figure 2:
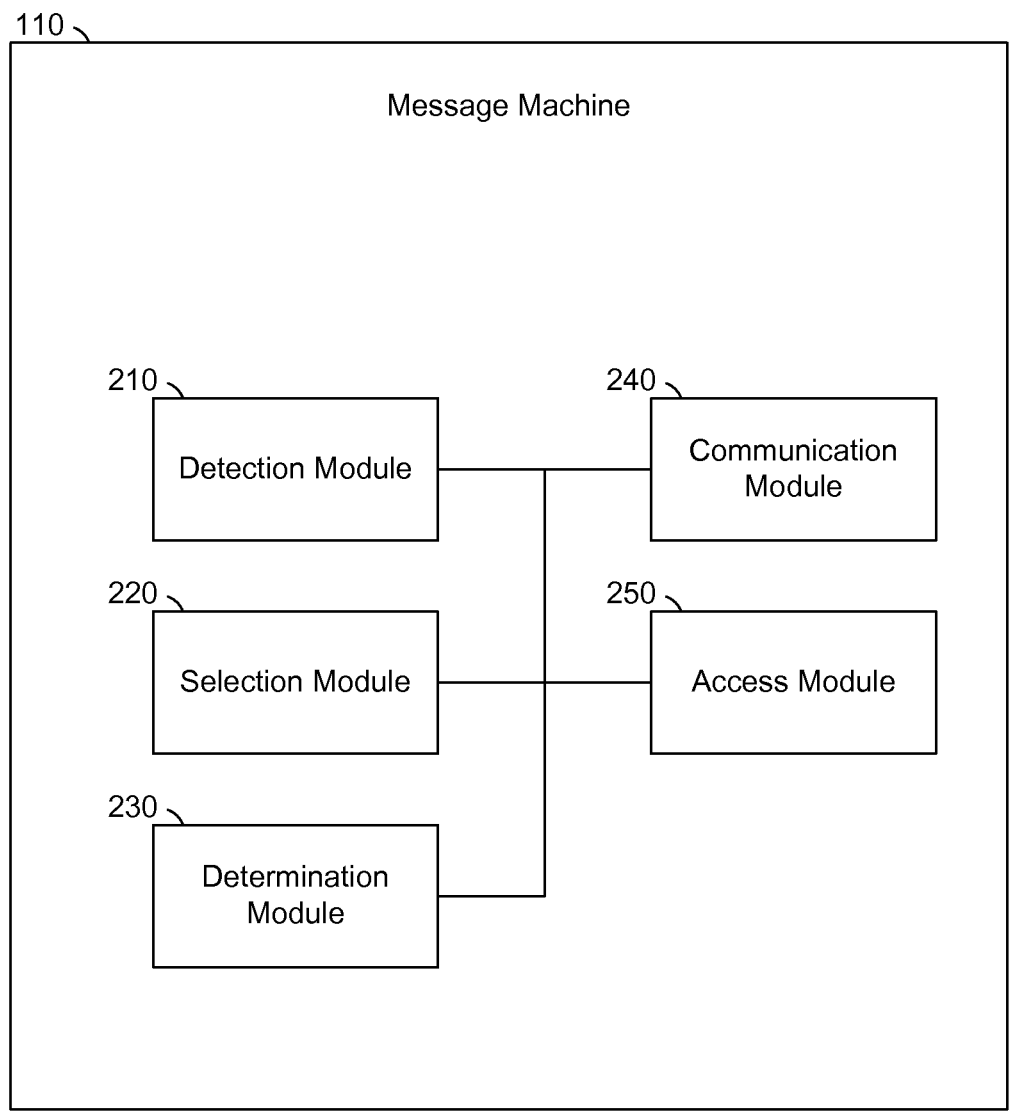
FIG. 2 is a block diagram illustrating components of a message machine, according to some example embodiments.

FIG. 2 is a block diagram illustrating components of the message machine 110, according to some example embodiments. The message machine 110 is shown as including a detection module 210, a selection module 220, a determination module 230, a communication module 240, and an access module 250, all configured to communicate with each other (e.g., via a bus, shared memory, or a switch).

In various example embodiments, the detection module 210 is configured to detect multiple accesses of an engagement interface. For instance, the engagement interface may be a web page that includes a description of an item. Alternatively, the engagement interface may be a smart phone application that is installed on a user device. Moreover, the engagement interface may be an audio file that is posted online. The multiple accesses of the engagement interface may include a first group of accesses performed by a first device (e.g., device 130) and a second group of accesses performed by a second device (e.g., device 150). Both devices may correspond to a user (e.g., user 152). For instance, the user may own both devices and may operate the first device duration a portion of a day and the second device duration another portion of the day. In various example embodiments, the detection module 210 is further configured to detect the first group of accesses performed by the first device (e.g., device 130) prior to detecting the second group of accesses performed by the second device (e.g. device 150). In various example embodiments, the detection module 210 is further configured to detect an event on the engagement interface, the event corresponding with an urgency level. For instance, a bidder placing a bid on an item displayed on the engagement interface may be the event. Moreover, the remaining time to place another bid on the item displayed on the engagement interface may be shortened, thereby escalating the urgency level of the event. As another example, a merchant may click on an item displayed on the engagement interface to indicate that the item is of limited availability. Due to the scarcity of the item, the urgency level of the event may be escalated.

In various example embodiments, the selection module 220 is configured to select a message from a set of messages available to be sent to the user. The set of messages may be stored in a database (e.g., database 115). Moreover, the selected message may correspond to the engagement interface. For instance, the selected message may pertain to an item described by the engagement interface.

In various example embodiments, the determination module 230 is configured to determine that the first device (e.g., device 130) corresponds to a greatest likelihood that the user will read the selected message. In various example embodiments, the selected message is an audio message and the determination module 230 is further configured to determine that the first device (e.g., device 130) corresponds to a greatest likelihood that the user will listen to the selected message. The determination module 230 may be further configured to identify the first group of accesses performed by the first device (e.g., device 130) as having a greater amount of user interaction with the engagement interface (e.g., click through rate, browsing rate, a number of gestures performed on a touchscreen that displays the engagement interface, time elapsed while interacting with the engagement interface) than the second group of accesses performed by the second device (e.g., device 150). In various example embodiments, the determination module 230 may be further configured to determine that a first specification (e.g., display size, processor speed, memory) of the first device is more compatible with the selected message than a second specification (e.g., display size, processor speed, memory) of the second device. For instance, the first device may have a larger screen as compared to the second device, and therefore, the first device may be more compatible with the selected message. The first specification and the second specification may accessed by the access module 250 as further explained below. In various example embodiments, the determination module 230 is further configured to determine a first location of the first device (e.g., device 130) based on the first group of accesses performed by the first device (e.g., device 130). For instance, the first location of the first device (e.g., device 130) may be sent to the detection module during the first group of accesses. Moreover, the engagement interface may request that the first location of the first device be revealed prior to allowing access. The request to reveal the first location of the first device may be displayed in the first device (e.g., device 130).

The determination module 230 is further configured to determine a second location of the second device (e.g., device 150) based on the second group of accesses performed by the second device (e.g., device 150). Likewise, the second location of the second device (e.g., device 150) may be sent to the detection module 210 during the second group of accesses. Alternatively, the engagement interface may request that the second location be revealed prior to allowing access. In various example embodiments, the determination module 230 is further configured to determine that the user is more likely to read the selected message at the first location than the second location. For instance, the first location may be a location where the user is frequently busy, whereas the second location may be a location where the user is more available. As another example, the first location may be where the user works whereas the second location may be where the user lives. In various example embodiments, the determination module 230 is further configured to identify the first group of accesses as occurring within a first period of time during which the first device (e.g., device 130) accessed the engagement interface more frequently than the second device (e.g. device 150) accessed the engagement interface during a second period of time.

In various example embodiments, the communication module 240 is configured to communicate the selected message to the first device (e.g., device 130) determined by the determination module 230 as corresponding to the greatest likelihood that the user will read the selected message. In various example embodiments, the communication module 240 is further configured to block communication of the selected message to the second device (e.g. device 150) in response to the determination module 230 determining that the first device corresponds to the greatest likelihood that the user will read the selected message. As a result, the second device may not receive the selected message. In various example embodiments, the communication module 240 is further configured to communicate the selected message to the first device after the detection module 210 detecting the second group of accesses of the engagement interface performed by the second device (e.g., device 150). In various example embodiments, the communication module 240 is further configured to communicate the selected message based on the urgency level corresponding to the event detected on the engagement interface. In various example embodiments, messages with higher urgency levels may be sent more quickly and prioritized above messages with lower urgency levels.

In various example embodiments, the access module 250 is configured to access device specifications. The access module 250 may access a first specification (e.g., display size, processor speed, memory) of the first device and a second specification (e.g., display size, processor speed, memory) of the second device. The device specifications may be accessed from a database (e.g., database 115). Moreover, the device specifications stored in the database may be indexed according to device type. The device specifications may be used by the determination module 230 as described above.

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
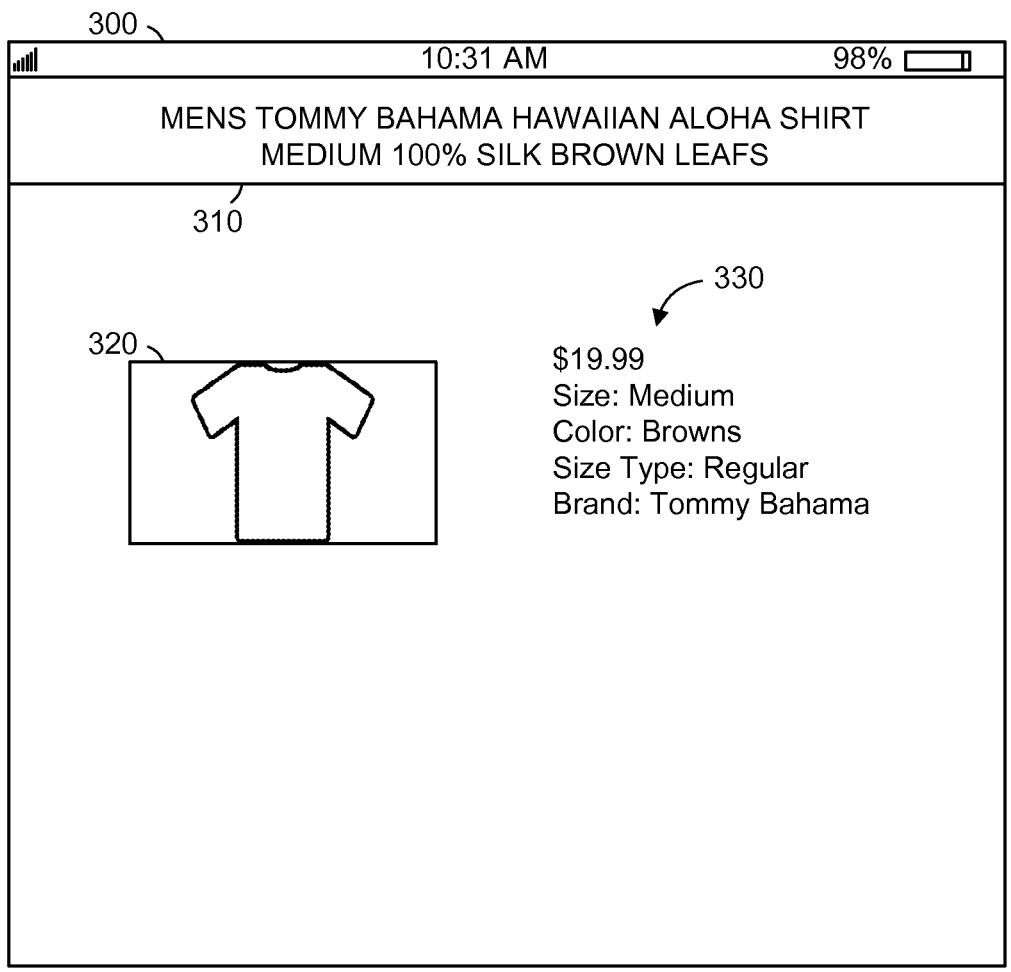
FIG. 3-4 are example user interfaces depicting an item displayed on an engagement interface, according to some example embodiments.

FIG. 3 is an example user interface 300 depicting an item displayed on an engagement interface, according to some example embodiments. The engagement interface may include a title of the item 310 (e.g., "Mens Tommy Bahama Hawaiian Aloha Shirt Medium 100% Silk Brown Leafs"), an image of the item 320, and a description of the item 330 (e.g., price, size, color, size type, and brand). The user (e.g., user 152) may be browsing the engagement interface on a first device (e.g., device 130) such as mobile device or smartphone belonging to the user (e.g., user 152).

Figure 4:
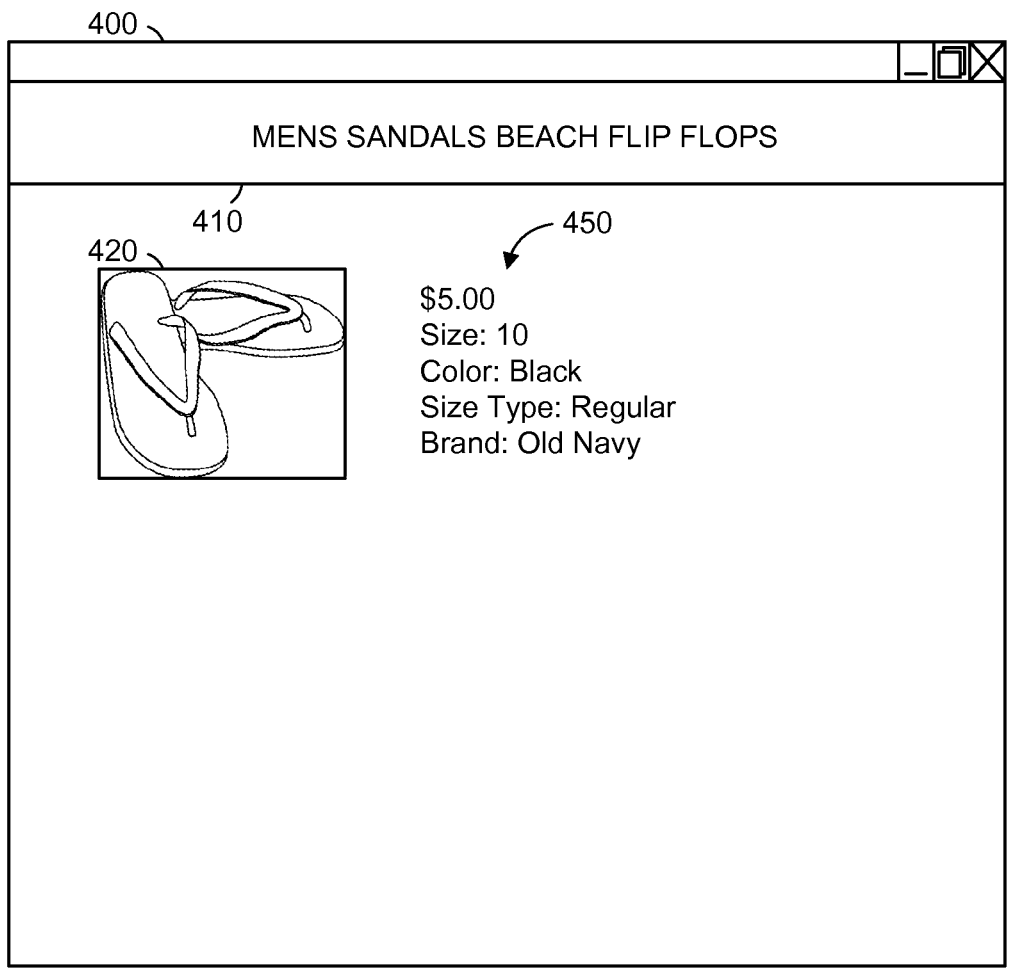

FIG. 4 is an example user interface 400 depicting an item displayed on an engagement interface, according to some example embodiments. The engagement interface may include a title of the item 410 (e.g., "Mens Sandals Beach Flip Flops"), an image of the item 420, and a description of the item 430 (e.g., price, size, color, size type, and brand). Moreover, the user may be browsing the engagement interface on a second device (e.g., device 150) such as a desktop computer belonging to the user (e.g., user 152).

Figure 5:
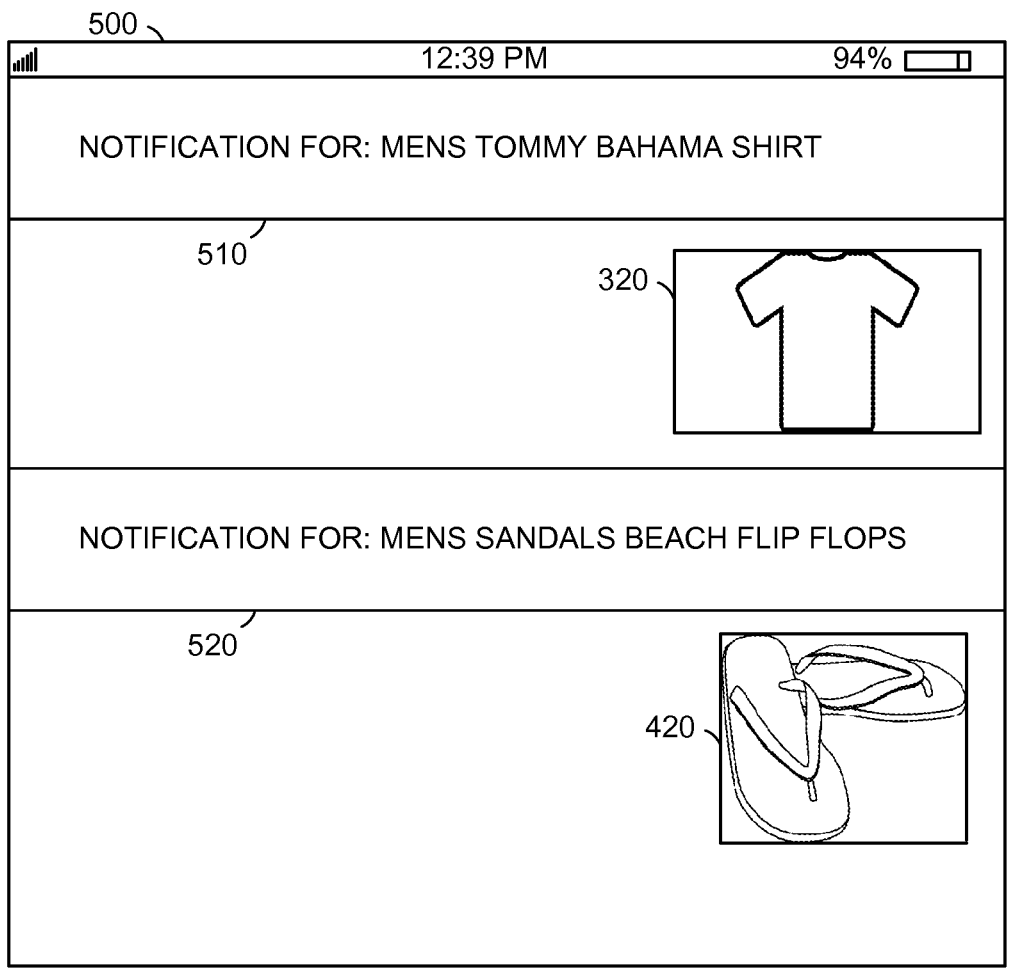
FIG. 5 is an example user interface depicting a message corresponding to an engagement interface, according to some example embodiments.

FIG. 5 is an example user interface 500 depicting a message corresponding to an engagement interface, according to some example embodiments. The message may include a first notification 510 and a second notification 520. The first notification 510 may correspond to the item displayed on the engagement interface in user interface 300 of FIG. 3. The second notification 520 may correspond to the item displayed on the engagement interface in user interface 400 of FIG. 4. For instance, the image of the item 320 in FIG. 3 may be displayed in the user interface 500. Moreover, the image of the item 420 in FIG. 4 may be displayed in the user interface 500. Moreover, the message corresponding to the engagement interface may be displayed on the first device (e.g., device 130) as a result of the determination module 230 determining the first device (e.g., device 130) as corresponding to the greatest likelihood that the user will read the message depicted in the user interface 500.

Figure 6:
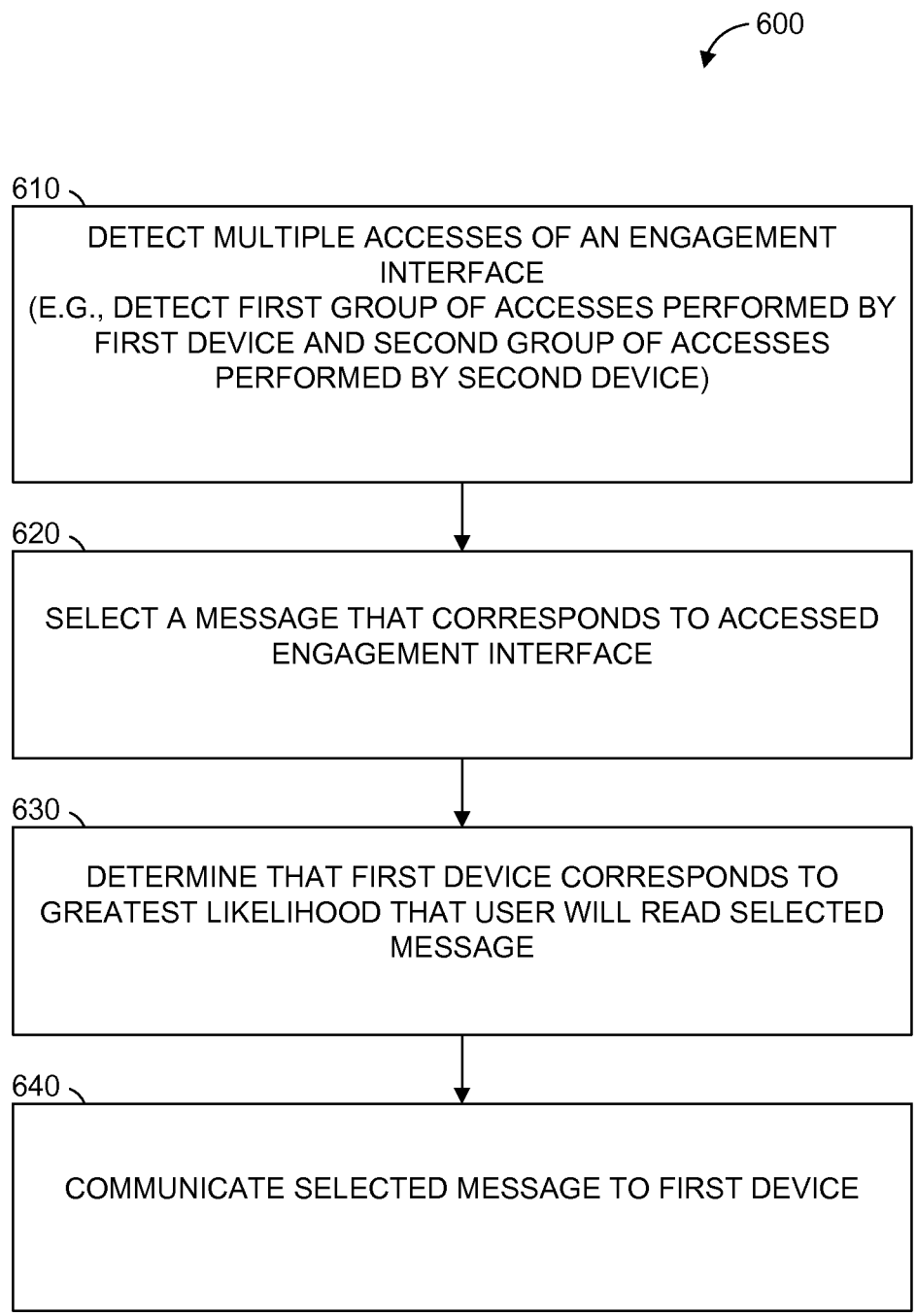
FIG. 6-8 are flowcharts illustrating a method of communicating a selected message to a device corresponding to a greatest likelihood that the user will read the selected message, according to some example embodiments.

FIG. 6 is a flowchart illustrating a method 600 of communicating a selected message to a device corresponding to a greatest likelihood that the user will read the selected message, according to some example embodiments.

At operation 610, the detection module 210 may detect multiple accesses of an engagement interface. The engagement interface may be a web page that includes a description of an item. Alternatively, the engagement interface may be a smart phone application that is installed on a user device. Moreover, the engagement interface may be an audio file that is posted online. The multiple accesses of the engagement interface may include a first group of accesses performed by a first device (e.g., device 130) and a second group of accesses performed by a second device (e.g., device 150). Both devices may correspond to a user (e.g., user 152).

At operation 620, the selection module 220 may select a message from a set of messages available to be sent to the user. The set of messages may be stored in a database (e.g., database 115). Moreover, the selected message may correspond to the engagement interface.

At operation 630, the determination module 230 may determine that the first device (e.g., device 130) corresponds to a greatest likelihood that the user will read the selected message.

At operation 640, the communication module 240 may communicate the selected message to the first device (e.g., device 130) determined by the determination module 230 as corresponding to the greatest likelihood that the user will read the selected message.

Figure 7:
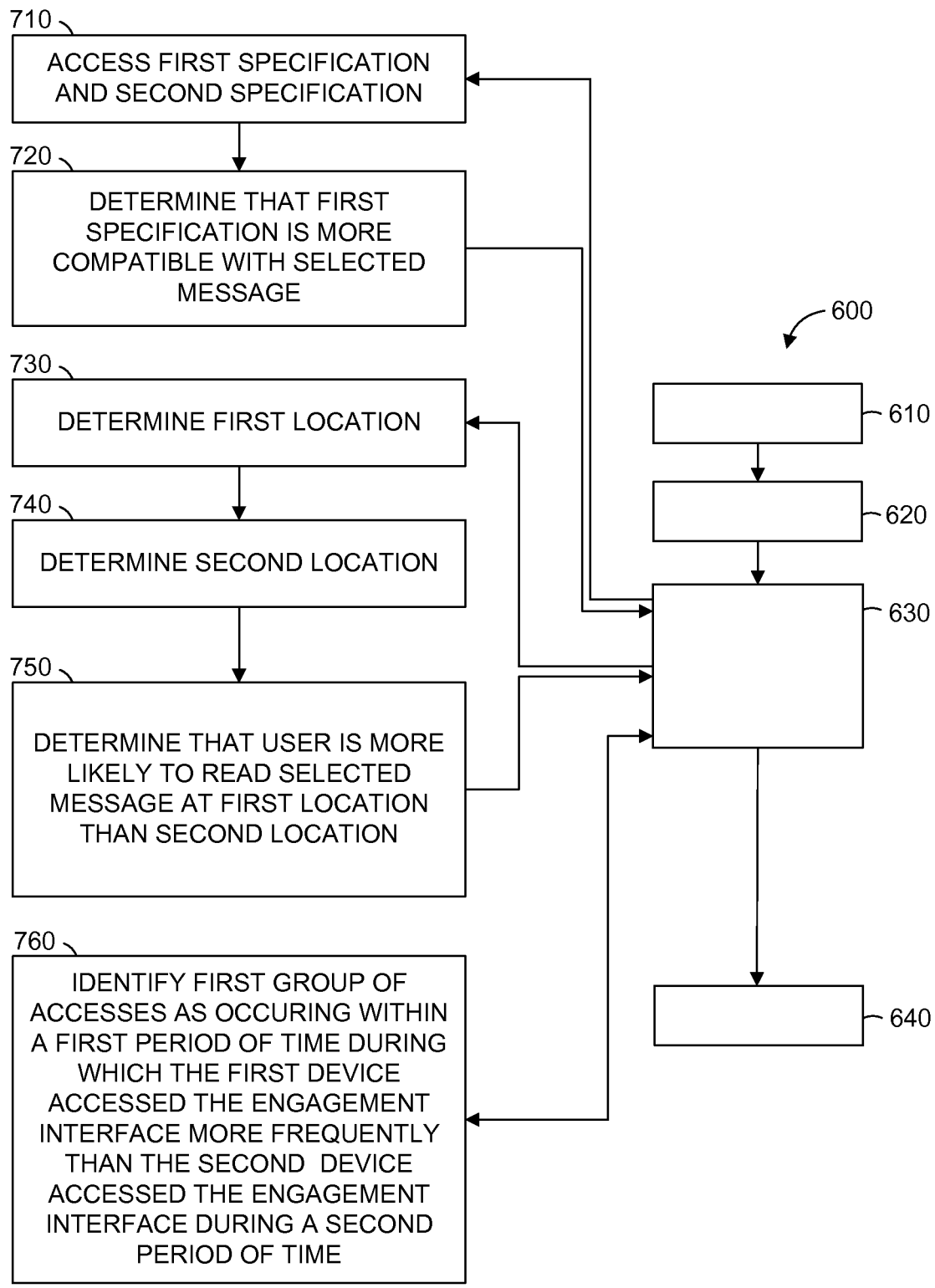

As shown in FIG. 7, the method 600 may include one or more of operations 710, 720, 730, 740, 750, and 760. One or more of operations 710–760 may be performed as part (e.g., a precursor task, a subroutine, or a portion) of method 600. At operation 710, the access module 250 may to access device specifications. The access module may access a first specification (e.g., display size, processor speed, memory) of the first device and a second specification (e.g., display size, processor speed, memory) of the second device. The device specifications may be accessed from a database (e.g., database 115).

At operation 720, the determination module 230 may determine that the first specification (e.g., display size, processor speed, memory) of the first device is more compatible with the selected message than the second specification (e.g., display size, processor speed, memory) of the second device.

At operation 730, the determination module 230 may determine a first location of the first device (e.g., device 130) based on the first group of accesses performed by the first device (e.g., device 130).

At operation 740, the determination module 230 may also determine a second location of the second device (e.g., device 150) based on the second group of accesses performed by the second device (e.g., device 150).

At operation 750, the determination module 230 may determine that the user is more likely to read the selected message at the first location than the second location.

At operation 760, the determination module 230 may identify the first group of accesses as occurring within a first period of time during which the first device (e.g., device 130) accessed the engagement interface more frequently than the second device (e.g. device 150) accessed the engagement interface during a second period of time.

Figure 8:
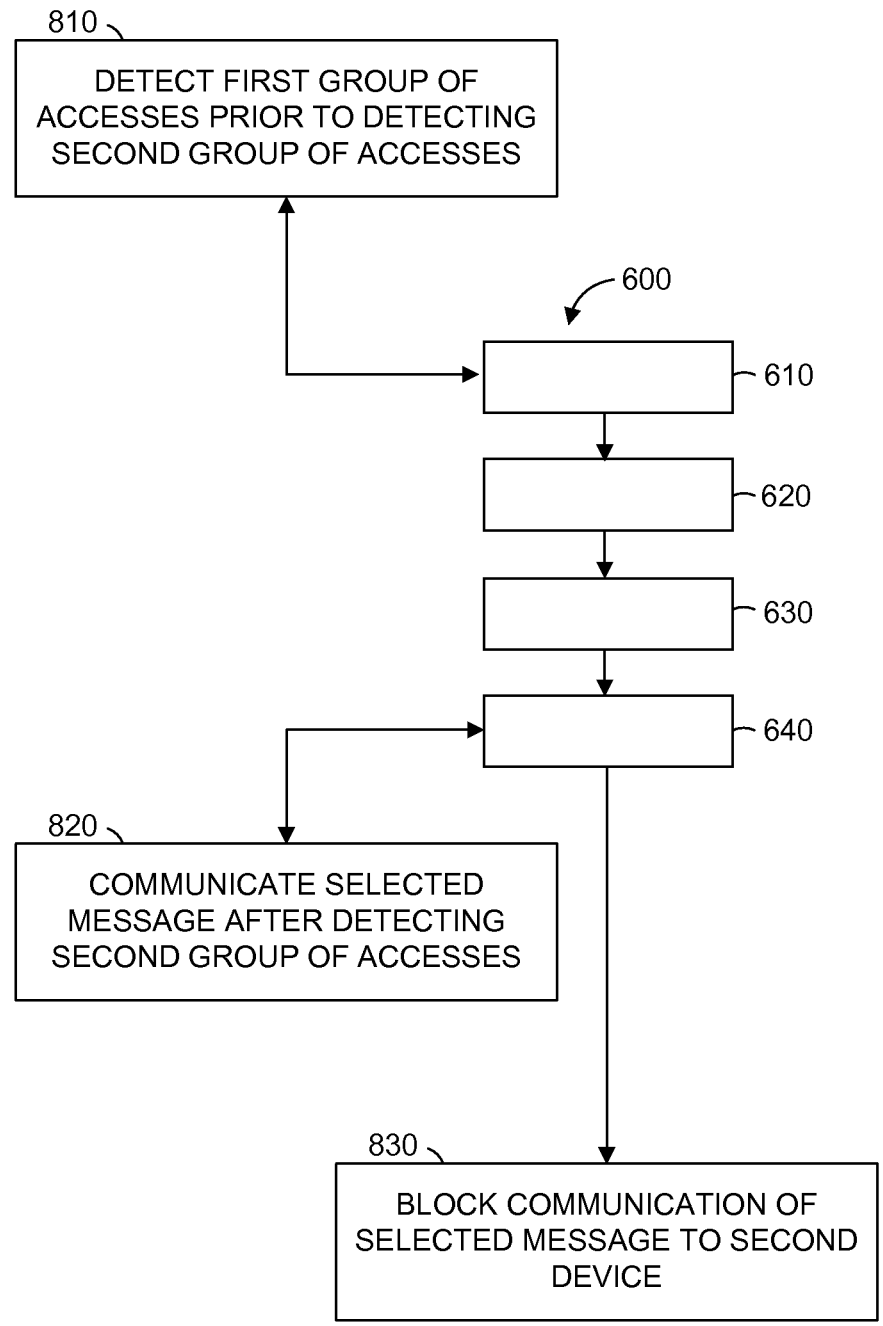

As shown in FIG. 8, the method 600 may include one or more of operations 810, 820, and 830. At operation 810, the detection module 210 may detect the first group of accesses performed by the first device (e.g., device 130) prior to detecting the second group of accesses performed by the second device (e.g. device 150).

At operation 820, the communication module 240 may communicate the selected message after the detection module 210 detecting the second group of accesses of the engagement interface performed by the second device (e.g., device 150).

At operation 830, the communication module 240 may block communication of the selected message to the second device (e.g. device 150) in response to the determination module 230 determining that the first device corresponds to the greatest likelihood that the user will read the selected message.

Figure 9:
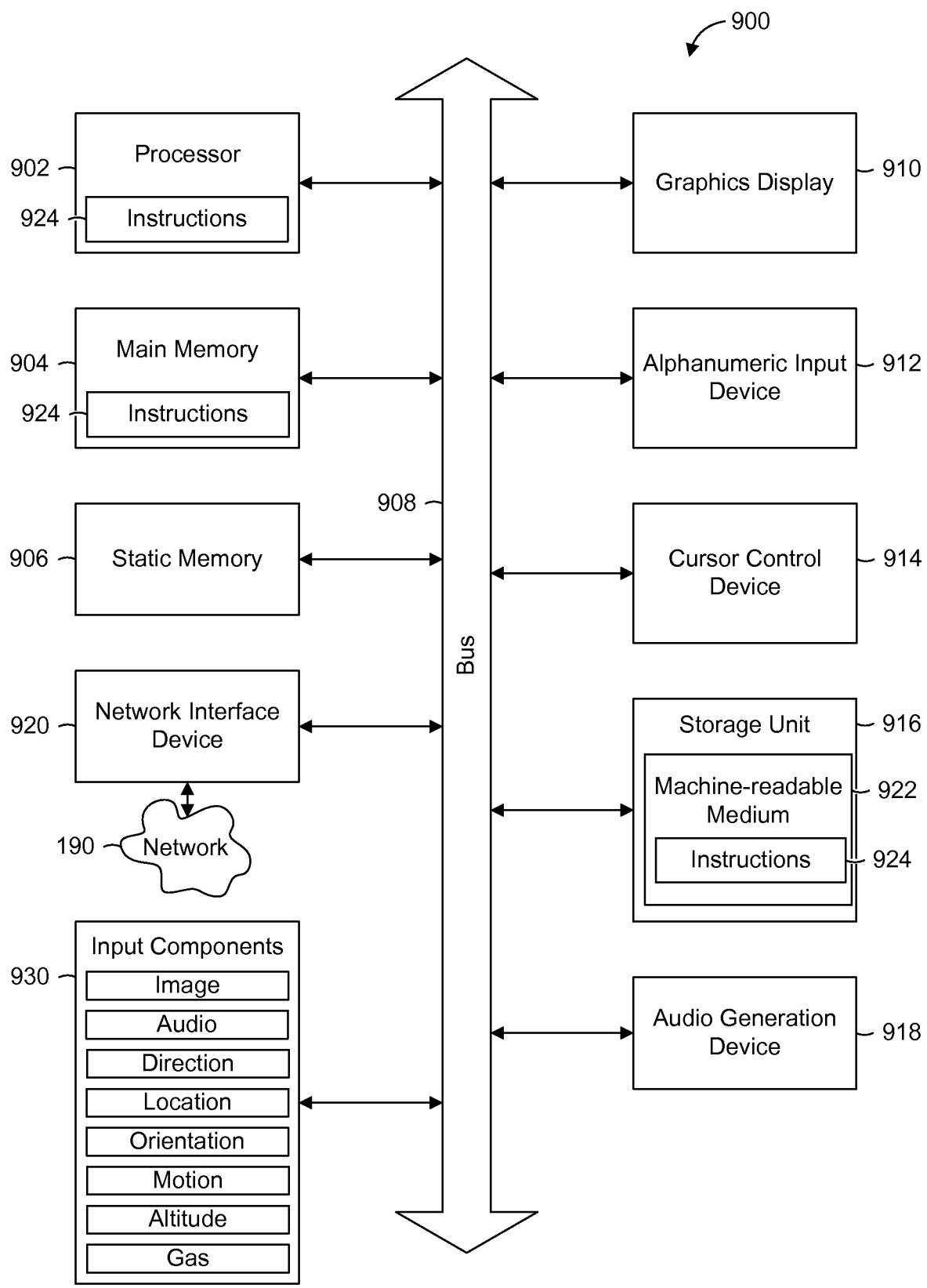
FIG. 9 is a block diagram illustrating components of a machine, according to some example embodiments, able to read instructions from a machine-readable medium and perform any one or more of the methodologies discussed herein.

FIG. 9 is a block diagram illustrating components of a machine 900, according to some example embodiments, able to read instructions 924 from a machine-readable medium 922 (e.g., a machine-readable storage medium, a computer-readable storage medium, or any suitable combination thereof) and perform any one or more of the methodologies discussed herein, in whole or in part. Specifically, FIG. 9 shows the machine 900 in the example form of a computer system within which the instructions 924 (e.g., software, a program, an application, an applet, an app, or other executable code) for causing the machine 900 to perform any one or more of the methodologies discussed herein may be executed, in whole or in part. In alternative embodiments, the machine 900 operates as a standalone device or may be connected (e.g., networked) to other machines. In a networked deployment, the machine 900 may operate in the capacity of a server machine or a client machine in a server-client network environment, or as a peer machine in a distributed (e.g., peer-to-peer) network environment. The machine 900 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 924, sequentially or otherwise, that specify actions to be taken by that machine. Further, while only a single machine is illustrated, the term "machine" shall also be taken to include any collection of machines that individually or jointly execute the instructions 924 to perform all or part of any one or more of the methodologies discussed herein.

The machine 900 includes a processor 902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 904, and a static memory 906, which are configured to communicate with each other via a bus 908. The processor 902 may contain microcircuits that are configurable, temporarily or permanently, by some or all of the instructions 924 such that the processor 902 is configurable to perform any one or more of the methodologies described herein, in whole or in part. For example, a set of one or more microcircuits of the processor 902 may be configurable to execute one or more modules (e.g., software modules) described herein.

The machine 900 may further include a graphics display 910 (e.g., a plasma display panel (PDP), a light emitting diode (LED) display, a liquid crystal display (LCD), a projector, a cathode ray tube (CRT), or any other display capable of displaying graphics or video). The machine 900 may also include an alphanumeric input device 912 (e.g., a keyboard or keypad), a cursor control device 914 (e.g., a mouse, a touchpad, a trackball, a joystick, a motion sensor, an eye tracking device, or other pointing instrument), a storage unit 916, an audio generation device 918 (e.g., a sound card, an amplifier, a speaker, a headphone jack, or any suitable combination thereof), and a network interface device 920.

The storage unit 916 includes the machine-readable medium 922 (e.g., a tangible and non-transitory machine-readable storage medium) on which are stored the instructions 924 embodying any one or more of the methodologies or functions described herein. The instructions 924 may also reside, completely or at least partially, within the main memory 904, within the processor 902 (e.g., within the processor's cache memory), or both, before or during execution thereof by the machine 900. Accordingly, the main memory 904 and the processor 902 may be considered machine-readable media (e.g., tangible and non-transitory machine-readable media). The instructions 924 may be transmitted or received over the network 190 via the network interface device 920. For example, the network interface device 920 may communicate the instructions 924 using any one or more transfer protocols (e.g., hypertext transfer protocol (HTTP)).

In some example embodiments, the machine 900 may be a portable computing device, such as a smart phone or tablet computer, and have one or more additional input components 930 (e.g., sensors or gauges). Examples of such input components 930 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 922 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 924 for execution by the machine 900, such that the instructions 924, when executed by one or more processors of the machine 900 (e.g., processor 902), cause the machine 900 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
   detecting multiple accesses of information about one or more items described in a multi-device engagement interface including detecting a first group of accesses comprising user interaction with the multi-device engagement interface of the one or more items performed by a first device and detecting a second group of accesses comprising user interaction with the multi-device engagement interface of the one or more items performed by a second device, the first and second devices corresponding to a user;
   selecting a message from a set of messages available to be sent to the user, the selected message corresponding to a detected event comprising additional information about the one or more items described in the multi-device engagement interface and interacted with by the user using the first and second devices;
   determining that the first device corresponds to a greatest likelihood that the user will access the selected message; and
   communicating the selected message corresponding to the additional information about the one or more items to the first device determined as corresponding to the greatest likelihood that the user will access the selected message.

2. The method of claim 1, wherein determining that the first device corresponds to a greatest likelihood that the user will access the selected message is based on the identifying the first group of accesses performed by the first device as having a greater amount of user interaction with the multi-device engagement interface than the second group of accesses performed by the second device.

3. The method of claim 1, further comprising:
   determining a first location of the first device based on the first group of accesses performed by the first device; and
   determining a second location of the second device based on the second group of accesses performed by the second device; and
   wherein the determining that the first device corresponds to the greatest likelihood that the user will access the selected message includes determining that the user is more likely to access the selected message at the first location than the second location.

4. The method of claim 1, further comprising:
   determining the first group of accesses as occurring during a particular portion of a day; and
   wherein the determining that the first device corresponds to the greatest likelihood that the user will access the selected message includes determining that the user is more likely to access the selected message on the first device during the particular portion of the day.

5. The method of claim 1, further comprising:
   accessing a first specification of the first device; and
   wherein communicating the selected message is based the first specification of the first device.

6. The method of claim 1, wherein determining that the first device corresponds to a greatest likelihood that the user will access the selected message comprises determining that the first device corresponds to a greatest likelihood that the user will listen to the selected message.

7. A system comprising:
   one or more processors; and
   a memory storing executable instructions that, when executed by the one or more processors, cause the one or more processors to perform operations comprising:
   detecting multiple accesses of information about one or more items described in a multi-device engagement interface, the multiple accesses of the multi-device engagement interface including a first group of accesses comprising user interaction with the multi-device engagement interface of the one or more items performed by a first device and a second group of accesses comprising user interaction with the multi-device engagement interface of the one or more items performed by a second device, the first and second devices corresponding to a user;
   selecting a message from a set of messages available to be sent to the user, the selected message corresponding to a detected event comprising additional information about the one or more items described in the multi-device engagement interface and interacted with by the user using the first and second devices;
   determining that the first device corresponds to a greatest likelihood that the user will access the selected message; and
   communicating the selected message corresponding to the additional information about the one or more items to the first device determined as corresponding to the greatest likelihood that the user will access the selected message.

8. The system of claim 7, wherein determining that the first device corresponds to a greatest likelihood that the user will access the selected message is based on the identifying the first group of accesses performed by the first device as having a greater amount of user interaction with the multi-device engagement interface than the second group of accesses performed by the second device.

9. The system of claim 7, wherein the operations further comprise:
   determining a first location of the first device based on the first group of accesses performed by the first device;
   determining a second location of the second device based on the second group of accesses performed by the second device; and
   determining that the user is more likely to access the selected message at the first location than the second location.

10. The system of claim 7, wherein the operations further comprise:
    identifying the first group of accesses as occurring within a first period of time during which the first device accessed the multi-device engagement interface more frequently than the second device accessed the multi-device engagement interface during a second period of time.

11. The system of claim 7, wherein the operations further comprise accessing a first specification of the first device and a second specification of the second device; and determining that the first specification of the first device is more compatible with the selected message than the second specification of the second device.

12. The system of claim 7, wherein determining that the first device corresponds to a greatest likelihood that the user will access the selected message comprises determining that the first device corresponds to a greatest likelihood that the user will listen to the selected message.

13. A system comprising:
   one or more processors; and
   a memory storing executable instructions that, when executed by the one or more processors, cause the one or more processors to perform operations comprising:
   performing a first group of accesses comprising multiple accesses of information about one or more items described in a multi-device engagement interface by a first device corresponding to user interaction with the multi-device engagement interface of the one or more items, and wherein the multi-device engagement interface is accessible by a second device corresponding to user interaction with the multi-device engagement interface of the one or more items; and
   receiving a message corresponding to a detected event comprising additional information about the one or more items described in the multi-device engagement interface and interacted with by the user using the first device and second devices, the message having been selected from a set of messages available to be communicated to the user and sent to the first device based on a determination that the first device corresponds to a greatest likelihood that the user will access the message.

14. The system of claim 13, wherein the first device is determined to correspond to the greatest likelihood that the user will access the message based on identifying that a first group of accesses performed by the first device as having a greater amount of user interaction with the multi-device engagement interface than a second group of accesses performed by the second device corresponding to the user.

15. The system of claim 13, wherein the first device is determined to correspond to the greatest likelihood that the user will access the message based on determining that the user is more likely to access the message at a first location.

16. The system of claim 13, wherein the first device is determined to correspond to the greatest likelihood that the user will access the message based on identifying the first group of accesses as occurring within a first period of time during which the first device accessed the multi-device engagement interface more frequently than the second device accessed the multi-device engagement interface during a second period of time.

17. The system of claim 13, wherein the message is selected to be sent to the first device based a first specification of the first device.

18. The system of claim 13, wherein the message is an audio message.

19. The system of claim 13, wherein the first group of accesses performed by the first device is prior to a second group of accesses of the multi-device engagement interface performed by the second device; and wherein the receiving of the message is performed after the second group of accesses of the multi-device engagement interface performed by the second device.

20. The system of claim 13, wherein the first device is determined to correspond to the greatest likelihood that the user will access the message based on determining that the user is more likely to access the message on the first device during a particular portion of a day.

* * * * *

UNITED STATES PATENT AND TRADEMARK OFFICE
CERTIFICATE OF CORRECTION

PATENT NO. : 10,979,376 B2
APPLICATION NO. : 16/263992
DATED : April 13, 2021
INVENTOR(S) : Steve Romero et al.

Page 1 of 1

It is certified that error appears in the above-identified patent and that said Letters Patent is hereby corrected as shown below:

In the Claims
Claim 5, Column 12, Line 11: "message is based the" should read --message is based on the--.
Claim 17, Column 14, Line 21: "first device based a" should read --first device based on a--.

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*